(12) United States Patent
Douglas et al.

(10) Patent No.: US 11,788,658 B2
(45) Date of Patent: Oct. 17, 2023

(54) DUCT STRINGER

(71) Applicant: AIRBUS OPERATIONS LIMITED, Bristol (GB)

(72) Inventors: Paul Douglas, Bristol (GB); Anthony John Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1119 days.

(21) Appl. No.: 16/451,428

(22) Filed: Jun. 25, 2019

(65) Prior Publication Data

US 2020/0002022 A1    Jan. 2, 2020

(30) Foreign Application Priority Data

Jun. 29, 2018 (GB) ..................................... 1810739

(51) Int. Cl.
| | |
|---|---|
| *F16L 37/256* | (2006.01) |
| *B64C 3/18* | (2006.01) |
| *F16L 37/248* | (2006.01) |
| *F16L 41/08* | (2006.01) |
| *F16L 37/00* | (2006.01) |

(52) U.S. Cl.
CPC ............ *F16L 37/008* (2013.01); *B64C 3/182* (2013.01); *F16L 37/248* (2013.01); *F16L 37/256* (2013.01); *F16L 41/08* (2013.01)

(58) Field of Classification Search
CPC ..... F16L 37/248; F16L 37/107; F16L 37/256; F16L 37/008; F16L 5/027; F16L 41/06; F16L 41/08; B64C 3/182
See application file for complete search history.

(56) References Cited

U.S. PATENT DOCUMENTS

| | | | |
|---|---|---|---|
| 3,596,936 A | | 8/1971 | Dieckmann |
| 3,734,545 A | * | 5/1973 | Stout ........................ F16L 41/02 |
| | | | 285/376 |
| 4,705,423 A | | 11/1987 | Smith |
| 4,736,968 A | * | 4/1988 | Glegg .................... F16L 37/248 |
| | | | 285/345 |
| 5,064,455 A | | 11/1991 | Lackner |
| 9,399,509 B2 | * | 7/2016 | Rolfes ..................... B64C 3/182 |
| 9,399,510 B2 | * | 7/2016 | Rolfes ..................... B64C 3/182 |
| 2002/0134453 A1 | | 9/2002 | Chikuma et al. |

(Continued)

FOREIGN PATENT DOCUMENTS

| | | | | |
|---|---|---|---|---|
| DE | 2527404 A1 | * | 1/1976 | ............ F16L 37/248 |
| DE | 2728887 A1 | * | 1/1978 | ............ F16L 37/248 |

(Continued)

OTHER PUBLICATIONS

Search Report for GB1810739.1, dated Dec. 11, 2018, 4 pages.
Extended European Search Report for European Application No. 19177447.0, eight pages, dated Oct. 30, 2019.

*Primary Examiner* — Matthew Troutman
*Assistant Examiner* — Fannie C Kee
(74) *Attorney, Agent, or Firm* — Nixon & Vanderhye P.C.

(57) ABSTRACT

A duct stringer forms at least part of a duct with a closed cross-section which is adapted to transport fluid. The duct stringer has a duct wall and a female bayonet fitting in the duct wall. The female bayonet fitting is configured to engage with a male bayonet fitting on a fluid transporting conduit to connect the fluid transporting conduit with the duct.

15 Claims, 4 Drawing Sheets

(56) References Cited

U.S. PATENT DOCUMENTS

| | | | | |
|---|---|---|---|---|
| 2006/0103131 A1* | 5/2006 | Masarwa | ............... | A01G 25/02 |
| | | | | 285/125.1 |
| 2010/0044514 A1 | 2/2010 | Tacke | | |
| 2013/0316147 A1 | 11/2013 | Douglas et al. | | |
| 2015/0336656 A1* | 11/2015 | Rolfes | ..................... | B64C 3/182 |
| | | | | 244/123.1 |
| 2016/0006140 A1 | 1/2016 | Schnoor | | |
| 2016/0052617 A1* | 2/2016 | Rolfes | ..................... | B64C 3/182 |
| | | | | 244/119 |
| 2016/0318594 A1 | 11/2016 | Paul | | |

FOREIGN PATENT DOCUMENTS

| | | | | |
|---|---|---|---|---|
| DE | 4110676 | 10/1992 | | |
| DE | 20 2005 013904 | 2/2006 | | |
| DE | 102011002074 B3 * | 10/2012 | ............. | F16L 41/08 |
| EP | 1 285 212 | 2/2003 | | |
| GB | 928633 A * | 12/1961 | ............ | F16L 37/248 |
| GB | 2119046 A * | 11/1983 | ............ | F16L 37/008 |
| GB | 2500222 | 9/2013 | | |
| GB | 2555193 A * | 4/2018 | ............. | F16L 5/027 |
| GB | 2575280 A * | 1/2020 | ............. | B64C 3/182 |
| WO | 2012/101439 | 8/2012 | | |

\* cited by examiner

DUCT STRINGER

CROSS RELATED APPLICATION

This application claims priority to United Kingdom (GB) Patent Application 1810739.1, filed Jun. 29, 2018, the entire contents of which are hereby incorporated by reference.

FIELD OF THE INVENTION

The present invention relates to a duct stringer. The present invention also relates to an aircraft assembly, an aircraft and a method of fluidly connecting a fluid transporting conduit to a duct of a duct stringer.

BACKGROUND OF THE INVENTION

US2013/0316147 discloses a stringer adapted to transport fluid in an aircraft wing. The stringer may be adapted to provide venting to one or more fuel tanks in the aircraft wing, or it may be adapted to provide fuel to the one or more fuel tanks. A downpipe is provided for providing a fluidic connection between the stringer and a fuel tank.

SUMMARY OF THE INVENTION

According to an aspect of the invention, there is provided a duct stringer forming at least part of a duct with a closed cross-section which is adapted to transport fluid, the duct stringer comprising a duct wall; and a female bayonet fitting in the duct wall, wherein the female bayonet fitting is configured to engage with a male bayonet fitting on a fluid transporting conduit to connect the fluid transporting conduit with the duct.

With this arrangement it is possible to straightforwardly and securely connect the conduit to the duct of the duct stringer.

The duct wall may have an internal duct surface and an external surface and the female bayonet fitting may be defined between the internal duct surface and the external surface. As such, the female bayonet fitting does not include protruding members.

The duct wall may comprise two or more layers. The duct wall may include a reinforcing member.

The duct wall may comprise an aperture between the internal duct surface and the external surface. The female bayonet fitting may comprise at least two slots extending through the duct wall.

The at least two slots may extend from the aperture.

A retaining recess may extend in the internal duct surface from each slot.

The at least two slots and the at least two retaining recesses may comprise at least two primary slots and the at least two primary retaining recesses, and at least one secondary slot and the at least one secondary retaining recess.

The duct wall may be a composite component.

The female bayonet fitting may be formed from one or more composite members. The composite members may be two or more composite layers.

The duct stringer of any preceding claim, wherein the duct stringer may have a hat-shaped profile and may comprise a pair of webs, a pair of feet and a crown. The duct wall may comprise the crown.

According to an aspect of the invention, there is provided an aircraft assembly comprising the duct stringer as described above, and a skin, wherein the duct stringer is adhered to the skin.

The aircraft assembly may comprise a fluid transporting conduit having a male bayonet fitting which is configured to engage with the female bayonet fitting.

The male bayonet fitting may be configured to be flush with, or recessed from, the internal duct surface when engaged with the female bayonet fitting.

The male bayonet fitting may comprise at least two tabs, each of the at least two tabs being configured to locate through each of the at least two slots and to be received in each retaining recess.

The thickness of each tab may be equal to or less than the depth of each retaining recess.

The male fitting may comprise a flange, wherein the duct wall may be configured to locate between the flange and each tab.

The flange may be configured to locate over the female bayonet fitting.

The aircraft assembly may comprise a locking arrangement configured to lock the male bayonet fitting in a locked condition with the female bayonet fitting.

The locking arrangement may comprise a locking member configured to engage the male bayonet fitting and the duct wall.

The locking member may comprise a threaded pin.

According to an aspect of the invention, there is provided an aircraft comprising the duct stringer as described above, and/or the aircraft assembly as described above.

According to an aspect of the invention, there is provided a method of mounting a fluid transporting conduit to a duct stringer forming at least part of a duct with a closed cross-section which is adapted to transport fluid, the duct stringer having a duct wall, and the method comprising: bringing the fluid transporting conduit together with the duct stringer; and engaging a male bayonet fitting on the fluid transporting conduit with a female bayonet fitting in the duct wall.

According to an aspect of the invention, there is provided an aircraft structural component forming at least part of a duct with a closed cross-section which is adapted to transport fluid, the aircraft structural component comprising a duct wall; and a female bayonet fitting in the duct wall, wherein the female bayonet fitting is configured to engage with a male bayonet fitting on a fluid transporting conduit to connect the fluid transporting conduit with the duct.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
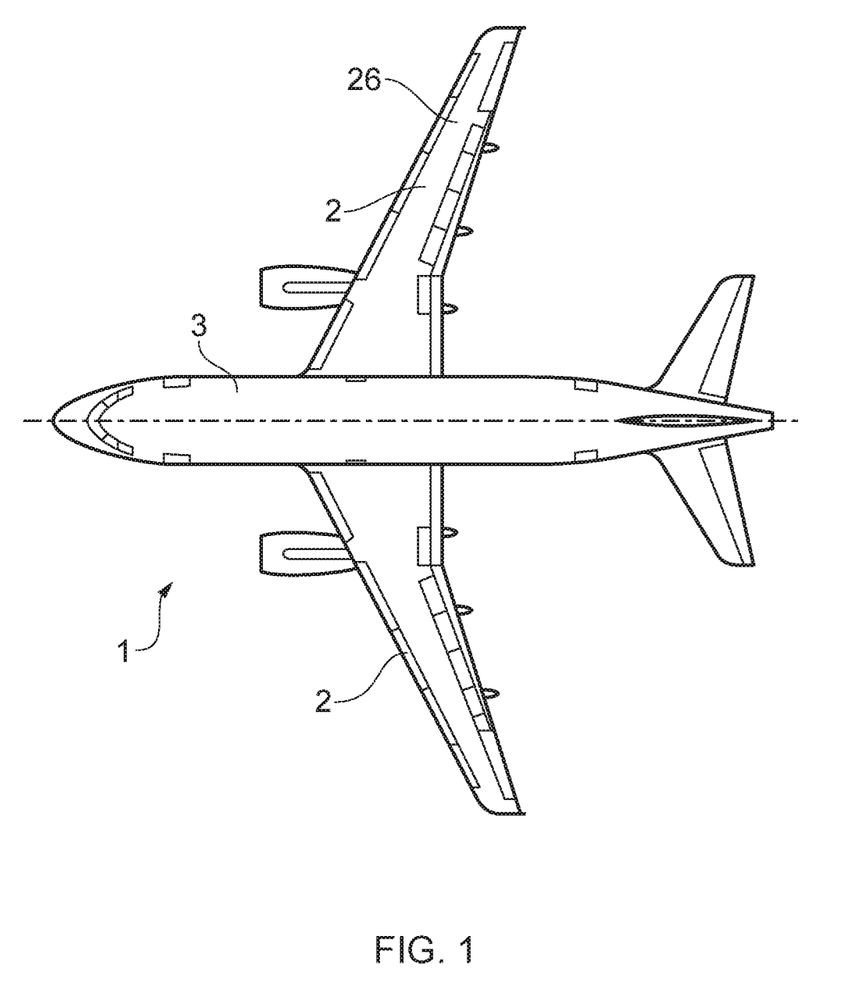
FIG. 1 is a plan view of an aircraft.
Figure 2:
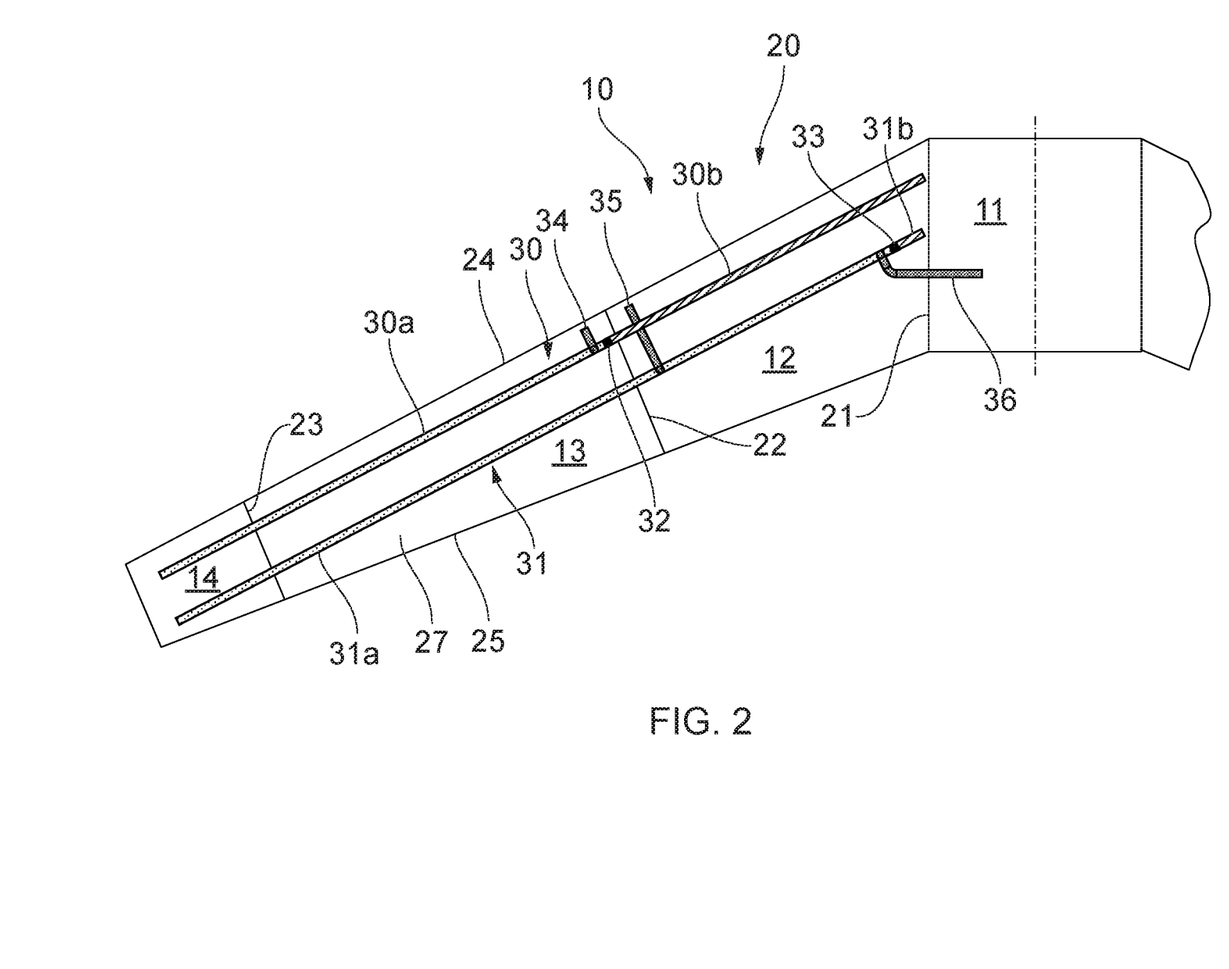
FIG. 2 is a schematic view of a wing with a fuel system.

FIG. 1 is a plan view of an aircraft 1 comprising a pair of wings 2 and a fuselage 3. FIG. 2 is a plan view of certain elements of a fuel system 10 of the aircraft 1, including a centre fuel tank 11 inside the fuselage 3, and wing tanks 12-14 inside the wing 2. The wing tanks 12-14 comprise an inboard fuel tank 12, an outboard fuel tank 13 and a surge tank 14. The tanks 12-14 are separated by ribs 21-23. Further ribs, not shown, are disposed between ribs defining the tanks 12-14.

The wing tanks 12-14 are bounded fore and aft by forward and rearward spars 24, 25. The upper and lower boundaries of the wing tanks 12-14 are provided by an upper wing skin 26 and a lower wing skin 27. Each wing skin is stiffened by stringers running span-wise along the length of the wing. Two of the stringers attached to the upper wing skin 26 are so-called "duct stringers" 30, 31 which are shown in FIG. 2. The other stringers attached to the upper wing skin 26 are not shown in order to simplify the drawing.

Each duct stringer 30, 31 includes a duct portion 30a, 31a outboard of an internal bulkhead 32, 33; and a non-duct portion 30b, 31b inboard of the internal bulkhead 32, 33.

The duct portion 30a of the duct stringer 30 is in fluid communication with the outboard fuel tank 13 via an interconnecting pipe 34. The duct portion 31a of the duct stringer 31 is in fluid communication with the inboard fuel tank 12 via an interconnecting pipe 35. The duct portion 31a of the duct stringer 31 is also in fluid communication with the centre fuel tank 11 via an interconnecting pipe 36. Each interconnecting pipe 34-36 acts as a fluid conduit. Optionally, the distal end of each interconnecting pipe 34-36 is fitted with a bell mouth or float valve, not shown.

During operation of the aircraft, the duct stringers 30, 31 are used to transport air in either direction between the surge tank 14 and the fuel tanks 11-13 in order to manage the air pressure within the tanks. So each duct stringer 30, 31 has two functions: stiffening the upper wing skin; and providing a duct which transports air to the surge tank 14.

Each duct stringer 30, 31 acts as a structural component of the aircraft 1. Each duct stringer 30, 31, acting as an aircraft structural component, forms part of an aircraft assembly 20. The aircraft structural components form part of an airframe of the aircraft 1.

Figure 3:
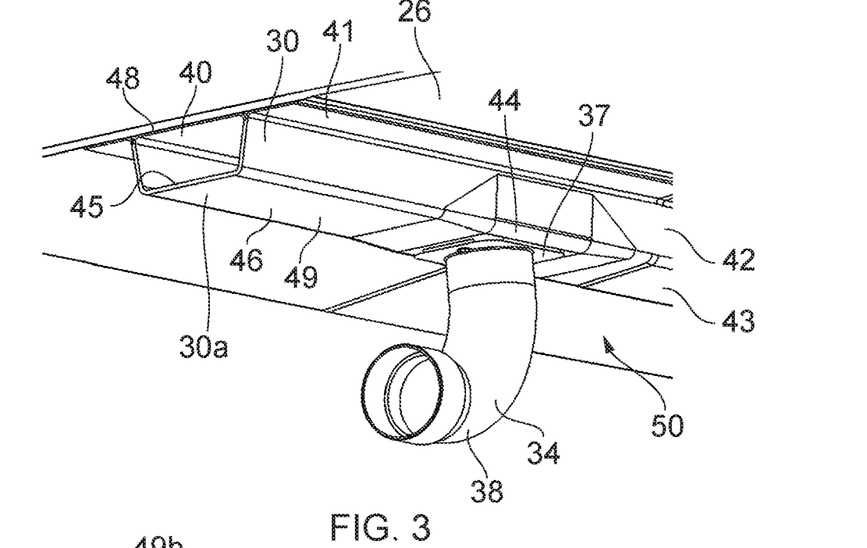
FIG. 3 is a partial perspective view of an upper wing skin and a duct stringer forming a fluid transporting duct with an interconnecting pipe mounted thereto by a fastening configuration.
Figure 4:
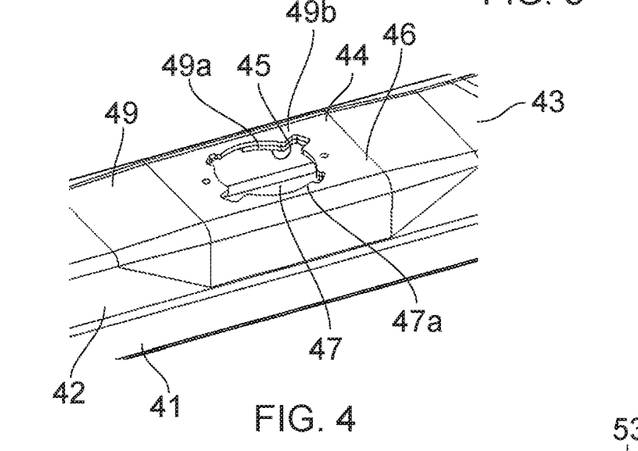
FIG. 4 is a partial view of the upper wing skin and the duct stringer of FIG. 3 with the interconnecting pipe removed.

Referring now to FIGS. 3 and 4, a partial view of the upper wing skin 26 and one of the duct stringers 30 is shown. FIG. 3 shows a section of the duct portion 30a of the duct stringer 30. The duct stringer 30 and the upper wing skin 26 together form an aircraft assembly. Interconnecting pipe 34 is connected to the duct stringer 30 by a fastening configuration 50.

Interconnecting pipe 34 acts as a fluid conduit. In the present embodiment, the fluid conduit is an elbow joint. Interconnecting pipe 34 comprises a base 37 and a pipe section 38. The base 37 is a flange at one end of the pipe section 38. A flow path is defined through the interconnecting pipe 34 and is open at a base end.

The aircraft assembly 20 comprising the upper wing skin 26 and the duct stringer 30 is shown in FIG. 4 with the interconnecting pipe 34 removed. The interconnecting pipe 34 is removable from the aircraft assembly 20 to provide for straightforward repair and/or replacement.

The duct stringer 30 and the upper wing skin 26 are integrally formed. The duct stringer 30 defines a duct 40. The duct is configured to transport a fluid. The skin 26 is on one side of the duct 40. The duct 40 has a closed cross-section which is adapted to transport a fluid. The duct 40 may be adapted to transport a gas and/or a liquid. It will be understood that the duct stringer 30 may be on another component. For example, the duct stringer 30 may be provided on the lower skin 27.

The duct stringer 30, acting as an aircraft structural component, comprises a duct wall 49. The duct stringer 30 comprises a pair of feet 41, a pair of webs 42 and a crown 43. The crown 43 defines a panel section of the duct wall 49. The pair of feet 41 are adhered to the upper wing skin 26.

The duct stringer 30 is formed from a carbon fibre reinforced plastic. Alternative materials, such as an alternative composite material, may be used to form the duct stringer 30. The upper wing skin 26 is formed from a carbon fibre reinforced plastic. Alternative materials, such as an alternative composite material, may be used to form the upper wing skin 26. The duct stringer 30 and the upper wing skin 26 may be co-cured, co-bonded or secondary bonded together to form an assembly.

The thickness of different portions of the duct stringer 30 may vary. In one embodiment, the thickness is varied by means of bearing the number of plies. The duct stringer 30 comprises a reinforcing panel 44. The duct stringer 30 has an internal duct surface 45 and an external surface 46. The reinforcing panel 44 is on an external side. The reinforcing panel 44 may be integrally formed with the remainder of the duct stringer 30 or may be omitted. The reinforcing panel 44 forms part of the duct wall 49. An aperture 47 is formed through the duct stringer 30. In the present embodiment, the aperture 47 is formed through the crown 43 of the duct stringer 30, although the aperture 47 may, in one embodiment, be formed through one of the pair of webs 42. The aperture 47 extends between the external surface 46 and the internal duct surface 45. The reinforcing panel 44 forms part of the external surface 46.

The duct stringer 30 includes an inner duct member 48. The inner duct member extends between the pair of webs 42 at the foot end of the webs 42. The inner duct member may be omitted, with the closed duct being formed by two or more members. A panel forming the inner duct member 48 may form part of the pair of webs 42 and the crown 43. The aperture 47 may extend through two or more panels forming the duct wall 49. The number of panels forming the duct wall 49 may vary along and/or across the duct stringer 30.

The aperture 47 is formed through a portion of the duct stringer 30 having two panel members. A bottom panel 49a and an upper panel 49b together form the crown 43. The upper panel 49b in the present embodiment is formed by the reinforcing panel 44. It will be understood that the number of panel members may differ, and may comprise a single panel member or three or more panel members. Each panel member may comprise a plurality of plies, not shown.

The aperture 47 is generally circular in profile. An aperture edge 47a forms a circumferentially extending edge.

Figure 5:
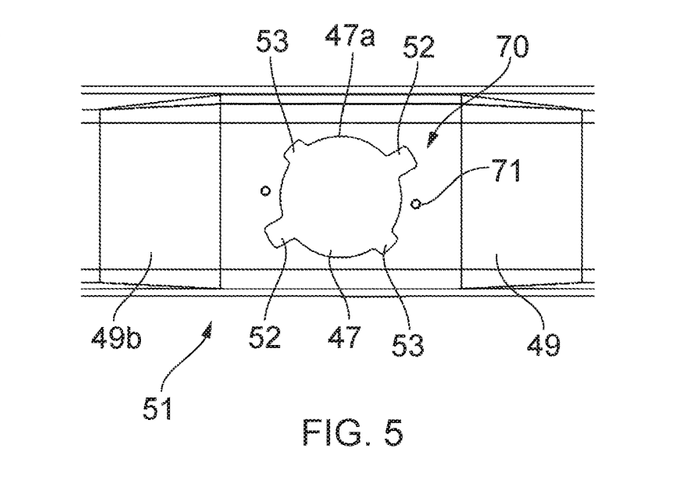
FIG. 5 is a partial plan view of the duct stringer of FIG. 3 with the interconnecting pipe removed.
Figure 7:
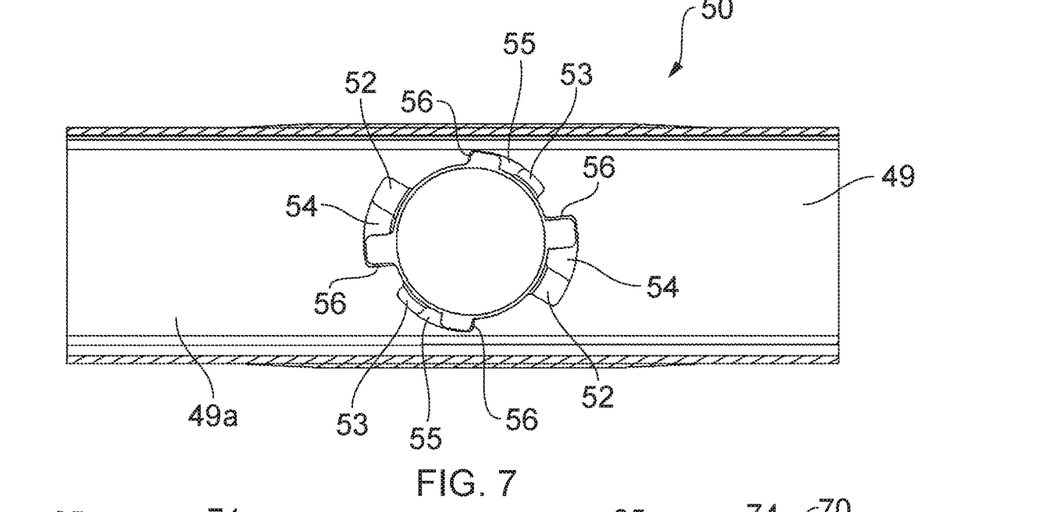
FIG. 7 is a cross-sectional view showing an internal duct surface side of the duct stringer.

Referring in particular to FIGS. 5 and 7, slots 52, 53 are formed through the duct wall 49. The slots 52, 53 extend from the aperture 47. As such, the slots 52, 53 extend from the aperture edge 47a. Two first slots 52 are formed diametrically opposite each other from the aperture 47. Two second slots 53 are formed diametrically opposite each other from the aperture 47. The first and second slots 52, 53 extend transverse from each other. Each slot 52, 53 extends radially from the aperture edge 47a. It will be understood that the number and distribution of the slots 52, 53 may vary. The size of the slots 52, 53 may also vary. The radial length of the first slot 52 is greater than the radial length of the second slot 53. That is, the first slots 52 extend further from the aperture edge 47a into the duct wall 49 than that of the second slots 53. In the present arrangement, two first slots 52 are shown. In an alternative embodiment a single first slot 52 is provided.

The fastening configuration 50 comprises a female bayonet fitting 51 and a male bayonet fitting 61. The male bayonet fitting 61 and the female bayonet fitting 51 are configured to interconnect to provide a secure mount. The female bayonet fitting 51 comprises the slots 52, 53 extending from the aperture 47 and retaining recesses 54, 55. The retaining recesses 54, 55 extend from the slots 52, 53. Each slot 52, 53 has a corresponding retaining recess 54, 55 extending therefrom. The retaining recesses 54, 55 are formed in the duct wall 49. As the aperture 47, the slots 52, 53 and the retaining recesses 54, 55 are formed in the duct wall 49, the female bayonet fitting 51 may be formed in a straightforward manner and may be compactly formed. The female bayonet fitting 51 does not protrude into the duct 40.

The slots 52, 53 extend through the duct wall 49 between the internal duct surface 45 and the external surface 46. The retaining recesses 54, 55 are in the internal duct surface 45. Each retaining recess 54, 55 extends in the internal duct surface 45 from the corresponding slot 52, 53. Each retaining recess 54, 55 has one slot 52, 53 at one end of the retaining recess 54, 55. As shown in FIG. 7, each first slot 52 has one first retaining recess 54 extending from the slot. Each second slot 53 has one second retaining recess 55 extending therefrom. The retaining recesses 54, 55 form undercuts in the duct wall 49. That is, the retaining recesses 54, 55 extend part way through the duct wall 49. Each retaining recess 54, 55 has a radial length corresponding to that of the corresponding slot 52, 53.

Each one of the retaining recesses 54, 55 defines an end stop 56. The end stop 56 is formed at an opposing end of the retaining recess 54, 55 from the slot 52, 53.

In the present embodiment, the retaining recess 54, 55 are formed by lower panel member 49a, with the slots 52, 53 being formed through both the lower and upper panel members 49a and 49b. However, it will be understood that in alternative embodiments the retaining recesses 54, 55 may be formed part way through one of the panel members, or the panel member if only one panel member.

Locking holes 71 are formed through the duct wall 49. The locking holes 71 form part of a locking arrangement 70. Two locking holes 71 are formed in the duct wall 49, although the number of locking holes 71 may differ. Each locking hole 71 extends through the duct wall 49 to one of the first retaining recesses 54, 55. The locking holes 71 are configured to receive a locking member 72, refer to FIG. 8.

Figure 6:
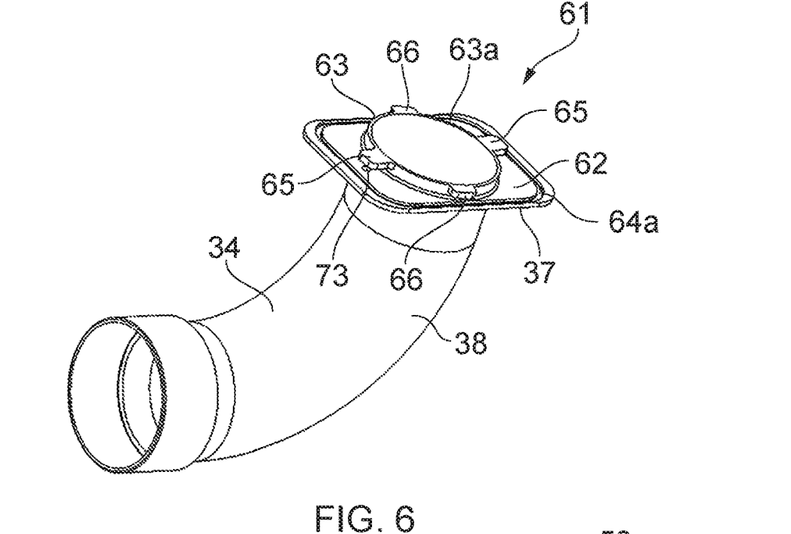
FIG. 6 is a perspective view of the interconnecting pipe.

Referring now to FIG. 6, the interconnecting pipe 34, acting as the fluid transporting conduit, is shown. The interconnecting pipe 34 comprises the male bayonet fitting 61. The male bayonet fitting 61 is formed at one end of the interconnecting pipe 34. The male bayonet fitting 61 is integrally formed with the interconnecting pipe 34. The base 37 of the interconnecting pipe 34 forms part of the male bayonet fitting 61. The base 37 forms a flange. The base 37 comprises a base mounting side 62. A rim 63 protrudes from the base mounting side 62. The base 37 is at one end of the pipe section 38. The rim 63 extends on an opposing side of the base 37 to the pipe section 38. The longitudinal length of the rim protruding from the base mounting side 62 corresponds to the thickness of the duct wall 49. When the female and male bayonet fittings 51, 61 are assembled, the rim 63 locates adjacent the aperture edge 47a. A free end 63a of the rim 63 extends flush with the internal duct surface 45. Alternatively, the free end 63a may be recessed from the internal duct surface 45.

Figure 8:
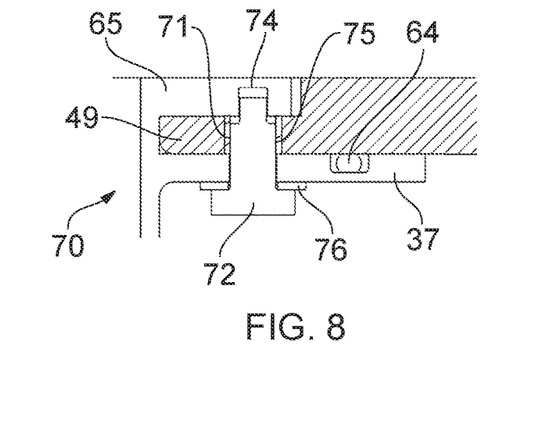
FIG. 8 is a cross-sectional view of a locking arrangement of the fastening configuration.

The base mounting side 62 is planar. A seal 64, refer to FIG. 8, is received in a seal channel 64a extending around a periphery of the base 37. The sealing arrangement may vary. In the present configuration, the seal 64 is an O-ring.

Engaging tabs 65, 66 extend at the free end 63a of the rim 63. The engaging tabs 65, 66 are on the base mounting side 62 of the base 37. The engaging tabs 65, 66 extend radially outwardly from the protruding rim 63. The engaging tabs 65, 66 are spaced from the base 37. The male bayonet fitting 61 comprises two first engaging tabs 65 and two second engaging tabs 66. The number and configuration of the engaging tabs 65, 66 corresponds to the number and configuration of the slots 52, 53. The first engaging tabs 65 extend from diametrically opposite sides of the rim 63. The two second engaging tabs 66 extend from diametrically opposite sides of the rim 63. The first engaging tabs 65 extend transversely to the second engaging tabs 66.

The size of the first and second engaging tabs 65, 66 substantially correspond to the size of the first and second slots 52, 53. The thickness of each tab 65, 66 corresponds to the depth of each retaining recess 54, 55 in which the engaging tabs 65, 66 are configured to be received. As such, when the engaging tabs 65, 66 are received in the retaining recesses 54, 55 then the engaging tabs 65, 66 do not protrude from the internal duct surface into the duct 40. Such an arrangement aids the prevention of an electrostatic build-up and/or flow interruption as a result of fluid flowing through the duct 40.

The distance between the engaging tabs 65, 66 and the base mounting side 62 of the base 37 substantially corresponds to the thickness of the duct wall 49 at each receiving slot 52, 53 so that the section of the duct wall 49 in which the retaining recesses 54, 55 are formed is able to be received between the base 37 and the engaging tabs 65, 66. It will be understood that the respective tabs 65, 66 may differ in thickness.

Base locking apertures 73 are formed through the base 37. Corresponding locking recesses 74 are formed in the first engaging tabs 65. Arrangement of the base locking apertures 73 and locking recesses 74, which are co-axial with each other, correspond to that of the locking holes 71 in the duct wall 49. As such, the locking apertures 73 are configured to align with the locking holes 71 when the male bayonet fitting 61 is engaged with the female bayonet fitting 51.

Figure 9:
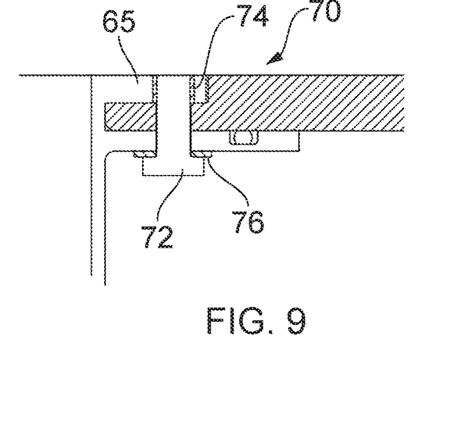
FIG. 9 is a cross-sectional view of another locking arrangement.

As shown in FIG. 8, the locking member 72 is receivable through the base locking aperture 73, through the locking holes 71 and into the locking recess 74 when the bayonet fitting is in an engaged condition, to lock the bayonet fitting in the engaged condition. The locking member 72 is a threaded pin which engages with a threaded arrangement 75 on the locking holes 71. In such a configuration, the locking recess 74 is a blind recess. In an alternative arrangement, as shown in FIG. 9, the lock member 72 is threadingly engaged with the locking recess 74 in the engaging tab 65. As shown in FIG. 9, the locking recess 74 is a through hole, although the arrangement may differ. A washer 76 is received between the lock members 72 and the base 37. The washer 76 may be a sealing washer to aid sealing of the locking arrangement 70 and so prevent a fluid path through the locking arrangement 70. In embodiments, the locking arrangement 70 could be oversealed.

To engage the interconnecting pipe 34 with the duct 40 and the duct stringer 30, the interconnecting pipe 34 is brought towards the duct stringer 30. The first and second engaging tabs 65, 66 are aligned with the first and second slots 52, 53 respectively. The engaging tabs 65, 66 are inserted through the slots 52, 53 to align with the retaining recesses 54, 55. The rim 63 and the aperture edge 47a aid alignment of the female and male bayonet fittings 51, 61. When the male bayonet fitting 61 is fully inserted in the female bayonet fitting 51, the interconnecting pipe 34 is rotated relative to the duct stringer 30. The male bayonet fitting 61 is therefore moved from an unengaged condition to an engaged condition. As the interconnecting pipe 34 is rotated, the engaging tabs 65, 66 slide in the retaining recesses 54, 55 until they abut the respective end stops 56, 56. It will be understood that the male bayonet fitting 61 is integrally formed with the remainder of the interconnecting pipe 34. As such any relative movement of the pipe section 38 provides for rotation of the male bayonet fitting 61. When the male bayonet fitting 61 is moved into the engaged condition with the female bayonet fitting 51, the interconnecting pipe 34 is restricted from being disengaged by movement in a linear direction away from the duct wall 49 by the retention of the engaging tab 65, 66 in retaining recesses 54, 55. The fluid transporting conduit formed by the interconnecting pipe 34 is therefore in fluid communication with the duct 40. The seal 64 forms a fluid seal between the base 37 and the duct wall 49.

When the male bayonet fitting 61 is engaged with the female bayonet fitting 51, the locking arrangement 70 is aligned such that each lock member 72 is insertable through the locking aperture 73 into the corresponding locking hole 71. As such, rotational movement of the male bayonet fitting 61 with respect to the female bayonet fitting 51 is prevented. The threaded engagement of the locking member 72 with either the locking hole 71 or the locking recess 74 provides an additional fail safe.

When assembled, the male bayonet fitting 61 does not protrude into the duct 40. In an alternative embodiment, the male bayonet fitting 61 protrudes into the duct 40. Furthermore, the female and male bayonet fittings 51, 61 are straightforwardly formed without the requirement for additional components.

To disengage the interconnecting pipe 34 from the duct stringer 30, the locking arrangement 70 is disengaged by removal of the lock member 72 from each of the locking holes 71 and the male bayonet fitting 61 is rotated in an opposing direction to the engaging motion. The engaging tabs 65, 66 may then be withdrawn through the slots 52, 53.

Although, in the above described embodiments, an aircraft structural assembly providing a duct is described by reference to the stringers in the wing, and by reference to the aircraft's fuel tank system, it will be understood that alternative configurations are possible. For example, in embodiments the structural component is a different structural component such as a fuselage stringer or fuselage frame.

In embodiments, the duct is configured to transport one or both of a gas and a liquid. For example, the duct may form part of an air distribution system such as cabin air; or may form a fuel supply line.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A duct stringer, comprising:
   a duct with a closed cross-section which is adapted to transport fluid;
   a duct wall with an internal duct surface inside the duct and an external surface outside the duct; and
   a female bayonet fitting in the duct wall,
   wherein the female bayonet fitting is configured to engage with a male bayonet fitting on a fluid transporting conduit to connect the fluid transporting conduit with the duct, and the female bayonet fitting is defined between the internal duct surface and the external surface,
   wherein the duct wall comprises an aperture between the internal duct surface and the external surface, and the female bayonet fitting comprises at least two shots extending through the duct wall, and
   wherein a retaining recess extends in the internal duct surface from east slot.

2. The duct stringer of claim 1, wherein the at least two slots extend from the aperture.

3. The duct stringer of claim 1, wherein the at least two slots and the at least two retaining recesses comprise at least two primary slots and the at least two primary retaining recesses, and at least one secondary slot and the at least one secondary retaining recess.

4. The duct stringer of claim 1, wherein the duct wall is a composite component.

5. A duct stringer comprising:
   a duct with a closed cross-section which is adapted to transport fluid;
   a duct wall with an internal duct surface inside the duct and an external surface outside the duct; and
   a female bayonet fitting in the duct wall;
   wherein the female bayonet fitting is configured to engage with a male bayonet fitting on a fluid transporting conduit to connect the fluid transporting conduit with the duct, and the female bayonet fitting is defined between the internal duct surface and the external surface,
   wherein the duct stringer has a hat-shaped profile and comprises a pair of webs, a pair of feet and a crown, and wherein the duct wall comprises the crown.

6. An aircraft assembly comprising a duct stringer comprising:
   a duct with a closed cross-section which is adapted to transport fluid;
   a duct wall with an internal duct surface inside the duct and an external surface outside the duct; and
   a female bayonet fitting in the duct wall,
   wherein the female bayonet fitting is configured to engage with a male bayonet fitting on a fluid transporting conduit to connect the fluid transporting conduit with the duct, and the fame bayonet fitting is defined between the internal duct surface and the external surface, and an aircraft skin,
   wherein the duct stringer is adhered to the aircraft skin.

7. The aircraft assembly of claim 6, comprising a fluid transporting conduit having a male bayonet fitting which is configured to engage with the female bayonet fitting.

8. The aircraft assembly of claim 7, wherein the male bayonet fitting is configured to be at least one of flush with and recessed from the internal duct surface when engaged with the female bayonet fitting.

9. The aircraft assembly of claim 7, wherein the duct wall has an aperture between the internal duct surface and the external surface, wherein the female bayonet fitting comprises at least two slots extending through the duct wall and a retaining recess extending from each slot in the internal duct surface, and wherein the male bayonet fitting comprises at least two tabs, each of the at least two tabs being configured to locate through each of the at least two slots and to be received in each retaining recess.

10. The aircraft assembly of claim 9, wherein a thickness of each tab is equal to or less than a depth of each retaining recess.

11. The aircraft assembly of claim 9, wherein the male bayonet fitting comprises a flange, wherein the duct wall is configured to locate between the flange and each tab.

12. The aircraft assembly of claim 11, wherein the flange is configured to locate over the female bayonet fitting.

13. The aircraft assembly of claim 7, comprising a locking arrangement configured to lock the male bayonet fitting in a locked condition with the female bayonet fitting.

14. The aircraft assembly of claim 13, wherein the locking arrangement comprises a locking member configured to engage the male bayonet fitting and the duct wall.

15. The aircraft assembly of claim 14, wherein the locking member comprises a threaded pin.

\* \* \* \* \*

UNITED STATES PATENT AND TRADEMARK OFFICE
CERTIFICATE OF CORRECTION

PATENT NO. : 11,788,658 B2  
APPLICATION NO. : 16/451428  
DATED : October 17, 2023  
INVENTOR(S) : Paul Douglas et al.

Page 1 of 1

It is certified that error appears in the above-identified patent and that said Letters Patent is hereby corrected as shown below:

In the Claims

Claim 1, Line 19, at Column 8, change "shots" to --slots--;

Claim 1, Line 22, at Column 8, change "east" to --each--; and

Claim 6, Line 57, at Column 8, change "fame" to --female--.

Signed and Sealed this  
Twenty-first Day of January, 2025

Coke Morgan Stewart  
*Acting Director of the United States Patent and Trademark Office*